United States Patent
Kim et al.

(10) Patent No.: US 6,826,408 B1
(45) Date of Patent: Nov. 30, 2004

(54) METHOD FOR TRANSMITTING AND RECEIVING MESSAGE OF SHORT MESSAGE BROADCASTING SERVICES IN TELECOMMUNICATION SYSTEM

(75) Inventors: Seong Whan Kim, Kyonggi-do (KR); Cheol Kyun Heo, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 462 days.

(21) Appl. No.: 09/655,403

(22) Filed: Sep. 5, 2000

(30) Foreign Application Priority Data

Sep. 3, 1999 (KR) ........................................ 199/37479

(51) Int. Cl.[7] .................................................. H04Q 7/20
(52) U.S. Cl. ........................ 455/466; 455/458; 455/515; 370/329
(58) Field of Search ............................. 455/426.1, 434, 455/464, 466, 458, 552.1, 567, 515, 574, 426; 370/312, 329, 335, 347, 432, 259

(56) References Cited

U.S. PATENT DOCUMENTS

| | | | | |
|---|---|---|---|---|
| 5,878,033 A | * | 3/1999 | Mouly | 370/312 |
| 5,909,651 A | * | 6/1999 | Chander et al. | 455/466 |
| 6,041,047 A | * | 3/2000 | Diachina et al. | 370/347 |
| 6,091,961 A | * | 7/2000 | Khalil | 455/466 |
| 6,111,865 A | * | 8/2000 | Butler et al. | 370/335 |
| 6,138,034 A | * | 10/2000 | Willey | 455/522 |
| 6,201,974 B1 | * | 3/2001 | Lietsalmi et al. | 455/466 |
| 6,332,006 B1 | * | 12/2001 | Rydbeck et al. | 375/262 |
| 6,349,210 B1 | * | 2/2002 | Li | 455/450 |
| 6,363,242 B1 | * | 3/2002 | Brown et al. | 455/70 |
| 6,421,540 B1 | * | 7/2002 | Gilhousen et al. | 455/458 |
| 6,505,052 B1 | * | 1/2003 | Jou | 455/466 |
| 6,505,058 B1 | * | 1/2003 | Willey | 455/574 |
| 6,526,027 B1 | * | 2/2003 | Yeom | 370/312 |
| 6,563,840 B1 | * | 5/2003 | Heo | 370/474 |

FOREIGN PATENT DOCUMENTS

| | | | |
|---|---|---|---|
| EP | 0928119 A2 | 7/1999 | |
| EP | 0928119 | * 7/1999 | ............ H04Q/7/22 |

* cited by examiner

*Primary Examiner*—William Trost
*Assistant Examiner*—Stephen M. D'Agosta
(74) *Attorney, Agent, or Firm*—Fleshner & Kim, LLP

(57) ABSTRACT

A method for transmitting and receiving short message broadcast services in a communication system is disclosed. The present invention reduces a battery consumption of a mobile station by additionally using an inserted message field of a broadcast indicator for notifying whether a broadcast message is being transmitted from a base station to the MS, thereby allowing a more efficient short message broadcast service.

43 Claims, 3 Drawing Sheets

A: Reacquisition of CDMA system
B: Mobile ststion's Assigned paging channel slot

FIG.8

| FIELD | LENGTH |
|---|---|
| TMSI_ZONE | 8 TMSI_ZONE_LEN |
| BCAST_INDEX | 3 |
| IMSI_T_SUPPORTED | 1 |

⋮

| QPCH_SUPPORTED | 1 |
|---|---|
| NUM_QPCH | 0 or 2 |
| QPCH RACH | 0 or 1 |
| QPCH_POWER_LEVEL_PAGE | 0 or 3 |
| QPCH_CCI_SUPPORTED | 0 or 1 |
| QPCH_BI_SUPPORTED | 0 or 1 |
| QPCH_POWER_LEVEL_CONFIG | 0 or 2 |

⋮

METHOD FOR TRANSMITTING AND RECEIVING MESSAGE OF SHORT MESSAGE BROADCASTING SERVICES IN TELECOMMUNICATION SYSTEM

BACKGROUND OF THE INVENTION

1. Field of the Invention

The present invention relates to mobile communication services, and more particularly to a method for transmitting and receiving short message broadcasting services in a code division multiple access communication system.

2. Description of the Related Art

Short Message Service (SMS) procedure for a code division multiple access (CDMA) system includes transmitting broadcast messages from a Short Message Service Center (SMSC) to mobile stations through a base station (BS), and receiving the broadcast messages transmitted from the BS at a mobile station MS. Generally, the BS transmits broadcast messages to a MS through two forward channels, namely a paging channel and a broadcast channel. A MS receiving the SMS chooses the messages from among the transmitted broadcast messages.

The BS may transmit broadcast messages using one of various transmitting methods such as a multi-slot broadcast transmission, a multi-slot broadcast paging or a periodic broadcast paging. Of these methods, the multi-slot broadcast message transmission is the simplest, causing the least amount of delay in transmission, and is used regardless of whether a periodic broadcast paging transmission is available. In the multi-slot broadcast message transmission, broadcast messages are transmitted from a BS to MSs within the service region of the BS through all slots of a control channel. However, because the broadcast messages are transmitted using all slots of the control channel, an overload of the control channel may occur, thereby impeding transmission of messages other than the broadcast messages.

On the other hand, the multi-slot broadcast paging is used when the periodic broadcast paging is unavailable. In this method, a general paging message of a relatively small size, which indicates a forthcoming transmission, is first transmitted to MSs through all slots of the control channel before transmitting a broadcast message of a large size.

However, the periodic broadcast paging is a more efficient method than the multi-slot broadcast transmission as well as the multi-slot broadcast paging methods. In the periodic broadcast paging, a BS gives a notice to MSs of the periodic transmission of broadcast messages before periodically transmitting the broadcast messages. Particularly, a BS first transmits a general page message including a broadcast page information in every first slot of a broadcast cycle. Thereafter, a MS can determine the type and time of the message transmission based on the broadcast page and receive broadcast messages in consecutive slots of the broadcast cycle.

A detailed explanation of the periodic broadcast paging, which is most commonly used by communication systems including the CDMA, will follow. However, a description of a common control channel will first be provided. The common control channel is a channel used when a BS transmits an overhead information required for the operation of a MS as well as a general paging message for paging a MS.

Generally, the common control channel is a paging channel or a broadcast channel, but for purposes of explanation, the operation of the common control channel will be discussed with respect to the paging channel. However, such operations can also be performed through a broadcast channel.

FIG. 1 shows a general configuration of a paging channel for the SMS. As shown in FIG. 1, a BS loads and transmits broadcast messages in a slot of 80 ms, where each slot recurs in every 2048 slot of the paging channel with respect to the system time. The slot (SLOT_NUM) at which a broadcast message is transmitted can be calculated by Equation 1 below, where 't' represent a system time for each am of the paging channel.

$$SLOT\_NUM = \lfloor t/4 \rfloor \bmod 2048 \qquad [1]$$

A MS remains in a non-active state and becomes active to receive broadcast messages transmitted in the 80 ms slot of the paging channel. Upon receipt of the messages, the MS returns back to the non-active or idle state. The periodic broadcast paging method in the related art will next be discussed with reference to FIG. 2.

Referring to FIG. 2, a BS transmits broadcast page information in every first slot of a broadcast cycle and transmits broadcast messages in subsequent slots of the broadcast cycle to MSs. A MS which is configured to receive SMS broadcast message then receives the broadcast messages based on broadcast page(s) by periodically monitoring every first slot of the broadcast cycle to receive the broadcast page information. Here, the maximum interval of the broadcast cycle (M) can be calculated by Equation 2, where 'i' represents a maximum slot cycle index (MAX_SLOT_CYCLE_INDEX) field value of a system parameter message transmitted to a MS through the paging channel.

$$M = 2^i \times 16, \ 0 \leq i \leq 7 \qquad [2]$$

Accordingly, based upon the broadcast cycle M, a BS transmits broadcast page information through a first slot of a broadcast cycle, where the slot number is calculated by Equation 3 below. In other words, the BS transmits Broadcast Pages 1, 2, and 3 through the first slot a broadcast cycle, which is indicated as '0' in the paging channel shown in FIG. 2.

$$\lfloor t/4 \rfloor \bmod M = 0 \qquad [3]$$

Each broadcast page transmitted through the first slot as described above, includes at least one broadcast address (BC_ADDR), where each BC_ADDR includes information regarding a broadcast message. As shown in FIG. 2, the first broadcast page would include two broadcast addresses corresponding to the first broadcast message in slots 3 and 4, the second broadcast page would include a broadcast address corresponding to the second broadcast message in slot 6, and the third broadcast page would include three broadcast addresses corresponding to the third broadcast message in slots 9~11. Thus, a BS periodically transmits broadcast page(s) in the first slot and broadcast messages in subsequent slots of the broadcast cycle, after notifying MSs of its broadcast cycle through a system parameter message of the paging channel.

Here, a broadcast index field (BCAST_INDEX) of an expanded system parameter message is used. Namely, a value of BCAST_INDEX is set as 'i, $(1 \leq i \leq 7)$' when the BS is providing a SMS and '0' otherwise. If the value of the BCAST_INDEX is set as 'i,' the broadcast cycle in which the broadcast message is transmitted can be calculated using Equation 4.

$$B = 2^i \times 16, \quad 1 \leq i \leq 7 \quad [4]$$

After the value of B is obtained by Equation 4, the broadcast message is transmitted by a broadcast cycle of (B+3) and the first slot of the broadcast cycle can be calculated by Equation 5.

$$\lfloor t/4 \rfloor \bmod M(B+3) = 0 \quad [5]$$

When broadcast messages are periodically transmitted through a paging channel, a MS must also periodically monitor the assigned paging channel. Thus, a MS receives the transmitted broadcast page(s) from the BS through the first slot of the broadcast cycle and if several broadcast addresses (BC_ADDR) are included in the broadcast page (s), the MS checks the subsequent slots to receive the necessary broadcast message.

In the CDMA system of the related art for the SMS, the broadcast index field BCAST_INDEX of the expanded sys parameter message is used only to set the state of a broadcast cycle and thus the SMS on or off. As a result, a BS cannot notify MSs that there is no broadcast message transmitted during certain broadcast cycles. Thus, a MS has to periodically monitor the common control channel to receive broadcast messages from a BS. Accordingly, a MS must periodically check the common control channel for at least every 80 ms, even when there are no messages transmitted from a BS. This unnecessarily wastes the power consumption of a MS.

SUMMARY OF THE INVENTION

Accordingly, an object of the present invention is to solve at least the problems and disadvantages of the related art.

Another object of the present invention is to provide amore efficient method for transmitting and receiving short broadcast message services in a communication system.

A further object of the present invention is to provide a method for transmitting and receiving short broadcast message services in a communication system which reduce a battery consumption of a mobile station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for transmitting and receiving short broadcast message services in a communication system comprises transmitting a broadcast indicator to notify whether a base station is transmitting a broadcast message to a mobile station; receiving the broadcast indicator by a mobile station; and receiving the broadcast message transmitted from the base station through a common control channel during a broadcast cycle when the broadcast message is transmitted at a predetermined broadcast cycle from the base station using the received broadcast indicator.

In another embodiment of the present invention, a method for transmitting and receiving short broadcast message services in a communication system comprises transmitting, from a base station to a mobile station, a broadcast indicator through an expanded system parameter message to notify whether the base station is transmitting a current broadcast message; determining, at the mobile station, a broadcast indicator value at an arrival time of the broadcast cycle notified by the base station; periodically checking, at the mobile station, a corresponding common control channel when the current broadcast message will be transmitted; and receiving, at the mobile station, a corresponding broadcast message along with periodically checking the channel totted the broadcast message.

BRIEF DESCRIPTION OF THE DRAWING

The invention will be described in detail with reference to the following drawings in which like reference numerals refer to like elements wherein:

FIG. 8 shows a partial field of an expanded system parameter message according to the present invention.

DETAILED DESCRIPTION OF THE PREFERRED EMBODIMENTS

Reference will now be made in detail to the preferred embodiments of the present invention, examples of which are illustrated in the accompanying drawings. Generally, the present invention transmits a broadcast indicator to a mobile station through a quick paging channel (QPCH) to notify the MS whether a base station is transmitting a broadcast message through a control channel. As in the related art, the control channel may be either a paging channel or a broadcast channel, but for purposes of explanation, the present invention will be discussed with respect to the paging channel.

Figure 1:
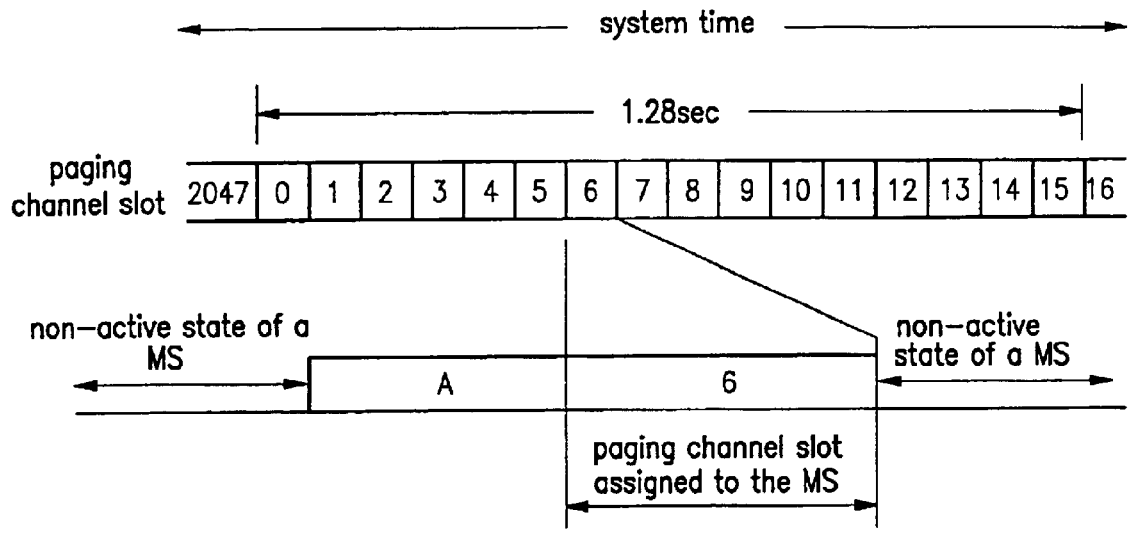
FIG. 1 shows a paging channel for a SMS.
Figure 2:
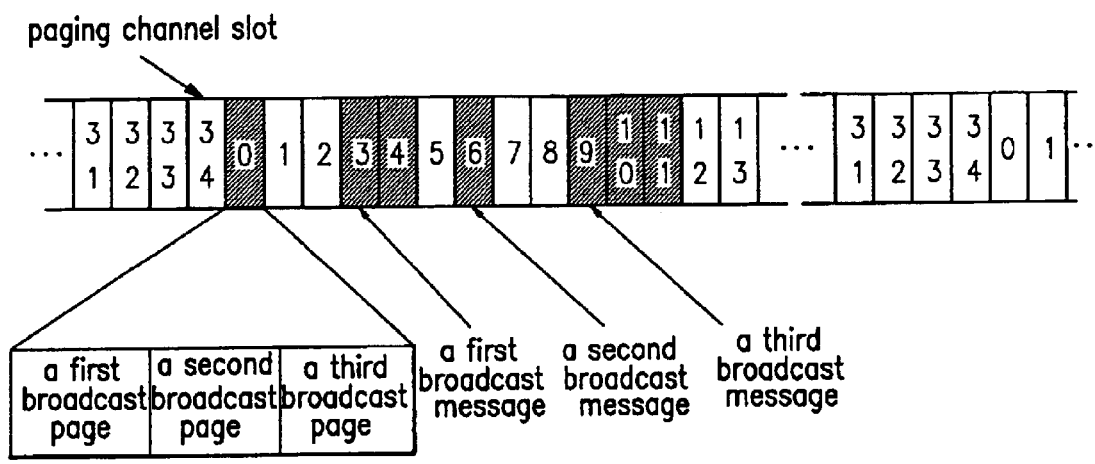
FIG. 2 shows a paging channel to explain a periodic broadcast paging method in the related art
Figure 3:
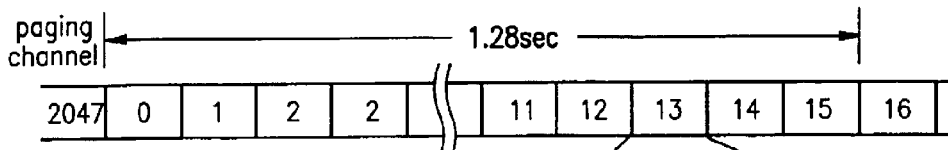
FIGS. 3 and 4 show a paging channel for a broadcast message transmitting and receiving method according to the present invention.
Figure 4:
Figure 5:
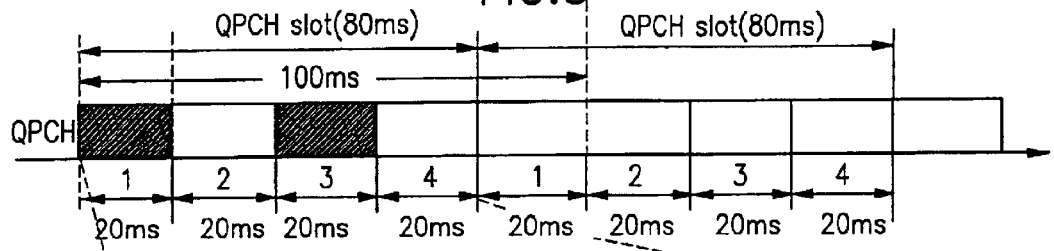
FIGS. 5 to 7 show a quick paging channel to explain a SMS according to the present invention.

FIG. 3 shows a paging channel for transmitting and receiving SMS according to the present invention. Also, FIG. 4 is an enlarged diagram of the paging channel of FIG. 3 and FIG. 5 shows a configuration of the QPCH to explain the SMS according to the present invention. Namely, the present invention additionally uses a QPCH_BI_SUPPORTED field in an expanded system parameter message. The QPCH_BI_SUPPORTED field is used to notify whether a BS provides a broadcast indicator to a MS.

Referring to FIG. 3, as in the CDMA mobile communication system in the related art, a BS loads and transmits broadcast message(s) in the 80 ms slot intervals of a broadcast cycle. However, in the present invention, a broadcast indicator as well as a paging indicator and a configuration change indicator are also periodically transmitted in an 80 ms interval to the MS through the QPCH, before transmitting the broadcast message(s), as shown in FIGS. 4 and 5. In the preferred embodiment, the indicators are transmitted 100 ms prior to transmitting the broadcast messages.

As in the related ark the broadcast cycle has a period of 2048 where each slot recurs in every 2048 slot of the paging channel with respect to the system time and the slot number SLOT_NUM in which a broadcast message is transmitted can be calculated by Equation 1. Similarly, a value of the maximum slot cycle index MAX_SLOT_CYCLE_INDEX field of the system parameter message is transmitted to the MS through the paging channel from the BS before periodically transmitting the broadcast message(s) and is used to calculate the maximum broadcast cycle M by Equation 2 above. Accordingly, the BS transmits the broadcast page information through the first slot of the broadcast cycle as calculated by Equation 3 based upon the maximum broadcast cycle M.

Also, the broadcast page information transmitted through the first slot of the broadcast cycle includes at least one broadcast addresses (BC_ADDR), where a BC_ADDR includes information regarding the broadcast message. Thereafter, the BS periodically transmits broadcast messages in subsequent slots corresponding to the broadcast address(es) in the broadcast cycle.

Furthermore, as in the related art, a broadcast index field BCAST_INDEX of an expanded system parameter message is used, where a value of BCAST_INDEX is set as 'i, ($1 \leq i \leq 7$)' when a BS provides a SMS and '0' otherwise. If the value of the BCAST_INDEX using 3 bits is set as 'i,' the broadcast cycle in which the broadcast message is transmitted can be calculated using Equation 4. After the value of B is obtained by Equation 4, a broadcast message can be transmitted by a broadcast cycle of (B+3) and the first slot of a broadcast cycle can be calculated by Equation 5.

According to the present invention, however, a BS may provide a broadcast indicator and a QPCH_BI_SUPPORTED field to MSs to notify that the BS is transmitting broadcast message(s). If a BS provides a broadcast indicator to MSs, the QPCH_BI_SUPPORTED of the expanded system parameter message would be set to a value of "1" to notify an existence of a broadcast indicator, and otherwise to a value of "0". Here, the value of QPCH_BI_SUPPORTED may alternatively be set to "0" to notify the existence of a broadcast indicator and to "1," otherwise.

The broadcast indicator which notifies an existence of a broadcast message is included and transmitted through the QPCH, where the QPCH is transmitted 100 ms prior to the transmission of a paging channel slot including a broadcast message. Moreover, the QPCH includes and transmits the paging indicator and a configuration on change indicator as well as the broadcast indicator. Particularly, the broadcast indicator may be inserted and transmitted in a reserved region of the QPCH. A MS then temporarily stores QPCH_BI_SUPPORTED field value of the expanded system parameter message from the BS in a memory device. If a MS in a non-active state is configured to receive a broadcast message, such MS would periodically monitor the first slot of the paging channel in every broadcast cycle.

However, if the QPCH_BI_SUPPORTED field value of the extended system parameter message is set to '1' and if a MS is configured to receive a broadcast indicator, such MS would check the QPCH transmitted 100 ms before each slot of the paging channel in the broadcast cycle to determine the broadcast indicator value and the BCAST_INDEX value. Thus, if the QPCH_BI_SUPPORTED field value is set to "1" and the broadcast indicator is also set to "1," a MS would determine that a broadcast page information and broadcast message(s) is transmitted through the paging channel and would monitor the paging channel to receive the necessary messages.

If the QPCH_BI_SUPPORTED field value is set to "1" while the broadcast indicator is set to "0," and the BCAST_INDEX value is "0," then a MS would enter into an idle state without monitoring the paging channel.

If the "QPCH_BI_SUPPORTED" field value is set to "0," a MS would periodically monitor the first slot of the paging channel for easy broadcast cycle as in the related art, and would receive the broadcast page information from the BS. Furthermore, if several broadcast addresses (BC_ADDR) are included in the broadest page information, a MS would monitor hew subsequent slots to receive the necessary broadcast message.

Figure 6:
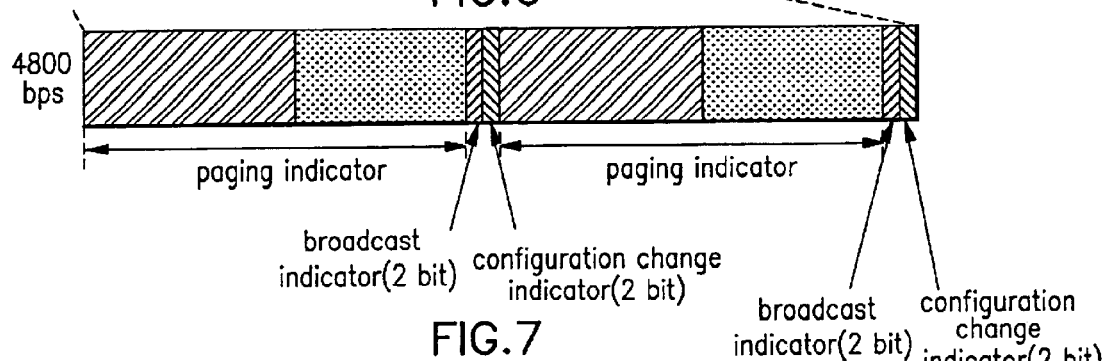
Figure 7:
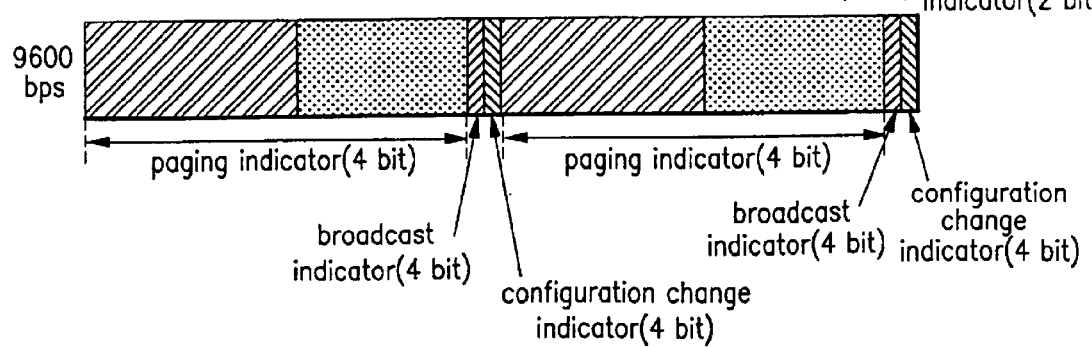

FIG. 6 shows the QPCH of FIG. 5 when the data rate is 4800 bps and FIG. 7 shows the QPCH of FIG. 5 when the data rate is 9600 bps. Namely, FIGS. 6 and 7 show configurations of the QPCH of FIG. 5 in which 1, 2 or 4 bits are used for transmitting the broadcast indicator. However, using 1 bit for the broadcast indicator requires a high power supply. Therefore, by transmitting the broadcast indicator using at least 2 bits, as shown in FIGS. 6 and 7, lowers the power consumption and reduces an interruption factor.

FIG. 8 shows a portion of the expanded system parameter message field which additionally includes the QPCH_BI_SUPPORTED field and the broadcast index field (BCAST_INDEX) of 3 bits according to the present invention.

According to the present transmitting and receiving method of short message broadcast services, the BS notifies to the MS, in advance, whether a transmission of broadcast message currently exists. Therefore, a MS need not unnecessarily and periodically monitor the common control channel (the paging channel or the broadcast channel) to receive a broadcast message from the BS, if there is no broadcast message. Thus, the present invention prevents a waste of power consumption by the MS and increases the efficiency of the short message broadcast services.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for transmitting and receiving short message broadcast services in a communication system comprising:

transmitting a broadcast indicator using a common control channel, the broadcast indicator indicating a transmission of a broadcast message on a paging channel or a broadcast channel, wherein the common control channel is a different channel from the paging channel or the broadcast channel;

receiving at the mobile station, the broadcast indicator through the common control channel and checking a status of the broadcast indicator; and receiving, at the mobile station, the broadcast message through the paging channel or the broadcast channel during a broadcast cycle if the status of the broadcast indicator received through the common control indicates the transmission of the broadcast message on the paging channel or the broadcast channel.

2. A method of claim 1, further comprising transmitting, from said base station to the mobile station, an index through the paging channel prior to transmitting the broadcast indicator the common control channel, wherein the index is used to calculate the broadcast cycle.

3. A method of claim 1, wherein the common control channel is a quick paging channel and the broadcast indicator is transmitted through the quick paging channel before transmitting the broadcast message through the paging channel or the broadcast channel.

4. A method of claim 3, wherein the broadcast indicator is provided in a reserved region of the quick paging channel.

5. A method of claim 4, wherein the quick paging channel further includes a paging indicator and a configuration change indicator, and the broadcast indicator is located between the paging indicator and the configuration change indicator.

6. A method of claim 3, wherein transmitting the broadcast indicator by at least 2 bits.

7. A method of claim 3, wherein transmitting the broadcast indicator 100 ms prior to transmitting a broadcast message.

8. A method of claim 1, further comprising:
setting a field to an expanded system parameter message and transmitting said set field to the mobile station, wherein said set field notifies whether said base station provides a broadcast indicator through the common control channel; and
checking, at the mobile station, the status of the broadcast indicator received through the common control channel, if set said field indicates that said base station provides a broadcast indicator on the common control channel.

9. A method of claim 8, wherein monitoring, at the mobile station, a first slot of a control channel in every broadcast cycle, if said field indicates that said base station does not provide a broadcast indicator.

10. A method of claim 8, wherein transmitting said set field to the mobile station before transmitting a broadcast message to the mobile station.

11. A method of claim 8, wherein temporarily stowing said field in a memory device of the mobile station.

12. A method of claim 1, wherein the mobile station enters an idle state if the broadcast indicator of the common control channel indicates non-transmission of a broadcast message through the paging channel or the broadcast channel.

13. A method for transmitting and receiving short message broadcast services in a communication system comprising:
setting a field to an expanded system parameter message and transmitting said set field to a mobile station, wherein said field notifies whether a base station provides a broadcast indicator on a quick paging channel;
transmitting the broadcast indicator through the quick paging channel before transmitting a broadcast message on a paging channel or the broadcast channel to notify whether the base station is transmitting a broadcast message to a mobile station;
receiving and checking, at the mobile station, the status of the broadcast indicator on the quick paging channel, if said set field indicates that the base station provides the broadcast indicator on the quick paging channel; and
receiving, at the mobile station, the broadcast message from said base station when the status of the broadcast indicator on the quick paging channel indicates that said base station is transmitting a broadcast message on the paging channel or the broadcast channel, during a broadcast cycle.

14. A method of claim 13, wherein inserting and transmitting the broadcast indicator in a reserved region of the quick paging channel by at least 2 bits.

15. A method of claim 13, wherein transmitting the broadcast indicator on the quick paging channel 100 ms prior to transmitting the broadcast message on the paging channel or the broadcast channel.

16. A method of claim 13, wherein monitoring, at the mobile station, a first slot of a control channel in every broadcast cycle, if said field indicates that said base station does not provide a broadcast indicator.

17. A method of claim 13, wherein the mobile station enters an idle state if the broadcast indicator on the quick paging channel indicates that said base station not is transmitting a broadcast message on the paging channel or the broadcast channel.

18. A method for receiving a broadcast message, comprising:
receiving a broadcast indicator on a first common channel and checking a status of the broadcast indicator on the first common channel; and
receiving a broadcast message on a second common channel from a base station when the status of the broadcast indicator on the first common channel indicates that the base station is transmitting the broadcast message on the second common channel, wherein the broadcast message is received through the second common control channel during a broadcast cycle and wherein the first common channel is a quick paging channel and the second common control channel is a paging channel or a broadcast channel.

19. The method of claim 18, wherein if the status of the broadcast indicator or the quick paging channel indicates that no broadcast message is transmitted, then the paging or broadcast channel is not monitored for the broadcast message.

20. The method of claim 18, further comprising:
receiving an extended system parameters message containing a broadcast indicator supported field; and
checking the status of the broadcast indicator if the broadcast indicator supported field indicates that the base station has provided a broadcast indicator.

21. The method of claim 20, wherein a first slot of the paging channel or the broadcast channel is continuously monitored if the base station does not provide a broadcast indicator on the quick paging channel.

22. The method of claim 18, wherein the base station provides the broadcast message indicator on the quick paging channel 100 ms prior to sending the broadcast message on the paging or broadcast channel.

23. An information slot in a quick paging channel (QPCH), comprising:
a plurality of paging indicators in the QPCH to indicate that a mobile station operating in an idle state should monitor at least one of a Paging Channel or a Forward Common Control Channel starting in a next slot;
a broadcast indicator in the QPCH to indicate whether a broadcast message is present on at least one of the paging channel or the Forward Common Control Channel; and
a configuration change indicator in the QPCH to indicate that the mobile station operating in the idle state that, after performing an idle handoff, it should monitor at least one of the Paging Channel, the Forward Common Control Channel, or a Broadcast Control Channel to determine if the mobile station should update stored parameters wherein the broadcast indicator precedes the configuration change indicator in the information slot, and wherein the information slot is sent from a base station to a subscriber unit to indicate whether the base station is transmitting a broadcast message.

24. The information slot of claim 23, wherein each of the broadcast indicator and the configuration change indicator has a length of 2 bits when a data rate is 4800 bps.

25. The information slot of claim 23, wherein each of the broadcast indicator and the configuration change indicator has a length of 4 bits when a data rate is 9600 bps.

26. The information slot of claim 25, wherein the base station is indicated to have sent a broadcast message when the broadcast indicator is set to 1.

27. A method comprising monitoring broadcast indicators on a Quick Paging Channel if an indicator is equal to "1", wherein the indicator indicates that a broadcast indicator is supported in the Quick Paging Cannel; and the indicator is in a QPCH_BI_SUPPORTED field in an extended system parameter message; and wherein said monitoring broadcast indicators is monitoring slots of the Quick Paging Channel and sad monitoring broadcast indicators on the Quick Paging Channel is performed only if BCAST_INDEX is not equal to "000", and wherein broadcast slots of the Quick Paging Channel are offset from common control channel slots by 100 ms.

28. The method of claim 27, wherein BCAST_INDEX is a broadcast slot cycle index.

29. A method for sending a broadcast message comprising:

setting at least one broadcast indicator in a Quick Paging Channel, wherein the broadcast indicator indicates existence of the broadcast message on a common control channel;

transmitting said at least one broadcast indicator from the base station;

setting a first information in an overhead message before transmitting the broadcast indicator, wherein the first information indicates a broadcast slot cycle index of transmitting the broadcast message;

setting a second information in the overhead message, wherein the second information indicates whether or not the broadcast indicator is supported in the quick paging channel; and transmitting the overhead message through the common control channel.

30. The method of claim 29, wherein the broadcast cycle index is 3 bits.

31. The method of claim 29, wherein the overhead message is an extended system parameter message.

32. The method of claim 29, wherein the first information is a broadcast slot cycle index field BCAST_INDEX and the second information is QPCH_BI_SUPPORTED.

33. The method of claim 32, wherein the broadcast slot cycle index field BCAST_INDEX is i, $1 \leqq = i \leqq = 7$.

34. The method of claim 29, wherein the common control channel is a paging channel or a broadcast channel.

35. The method of claim 29, comprising transmitting the broadcast message in the common control channel at a predetermined amount of time after said transmitting said at least one broadcast indicator.

36. The method of claim 35, wherein the predetermined amount of time is 100 ms.

37. A method comprising:

receiving a broadcast indicator on a quick paging channel (QPCH);

if the broadcast indicator indicates existence of a broadcast message, then monitoring a common control channel for reception of the broadcast message, wherein the common control channel is a paging channel or a broadcast channel;

receiving an overhead message through a common channel before receiving the broadcast indicator on the QPCH; and obtaining a first information and a second information in an overhead message, wherein the first information indicates a broadcast slot cycle index of transmitting the broadcast message and the second information indicates whether or not the at least one broadcast indicator is supported in the quick paging channel.

38. The method of claim 37, wherein the method is implemented in a mobile station.

39. The method of claim 38, wherein the method is implemented only if the mobile station supports monitoring the broadcast indicator in the quick paging channel.

40. The method of claim 37, wherein the overhead message is an extended system parameter message.

41. The method of claim 40, wherein the first information is a broadcast slot cycle index field BCAST_INDEX and the second information is a QPCH_BI_SUPPORTED.

42. The method of claim 41, wherein the broadcast slot cycle index field is BCAST_INDEX is 3 bits.

43. The method of claim 42, wherein the 3 bits represent a number ranging from 1 to 7.

* * * * *

UNITED STATES PATENT AND TRADEMARK OFFICE
CERTIFICATE OF CORRECTION

| | |
|---|---|
| PATENT NO. | : 6,826,408 B1 |
| DATED | : November 30, 2004 |
| INVENTOR(S) | : Seong Whan Kim and Cheol Kyun Heo |

It is certified that error appears in the above-identified patent and that said Letters Patent is hereby corrected as shown below:

Column 6,
Line 37, Claim 1 should read:
    1. A method for transmitting and receiving short message for broadcast services in a communication system comprising:
    transmitting a broadcast indicator using a common control channel, the broadcast indicator indicating a transmission of a broadcast message on a paging channel or a broadcast channel, wherein the common control channel is a different channel from the paging channel or the broadcast channel;
    receiving at the mobile station, the broadcast indicator through the common control channel and checking a status of the broadcast indicator; and
    receiving, at the mobile station, the broadcast message through the paging channel or the broadcast channel during a broadcast cycle if the status of the broadcast indicator received through the common control channel indicates the transmission of the broadcast message on the paging channel or the broadcast channel.

Column 7,
Line 33, Claim 13 should read:
    13. A method for transmitting and receiving short message for broadcast services in a communication system comprising:
    setting a field to an expanded system parameter message and transmitting said set field to a mobile station, wherein said field notifies whether a base station provides a broadcast indicator on a quick paging channel;
    transmitting the broadcast indicator through the quick paging channel before transmitting a broadcast message on a paging channel or the broadcast channel to notify whether the base station is transmitting a broadcast message to a mobile station;
    receiving and checking, at the mobile station, the status of the broadcast indicator on the quick paging channel, if said set field indicates that the base station provides the broadcast indicator on the quick paging channel; and
    receiving, at the mobile station, the broadcast message from said base station when the status of the broadcast indicator on the quick paging channel indicates that said base station is transmitting a broadcast message on the paging channel or the broadcast channel, during a broadcast cycle.

Column 8,
Line 4, Claim 18 should read:
    18. A method for receiving a broadcast message, comprising:
    receiving a broadcast indicator on a first common channel and checking a status of the broadcast indicator on the first common channel; and

UNITED STATES PATENT AND TRADEMARK OFFICE
CERTIFICATE OF CORRECTION

| | |
|---|---|
| PATENT NO. | : 6,826,408 B1 |
| DATED | : November 30, 2004 |
| INVENTOR(S) | : Seong Whan Kim and Cheol Kyun Heo |

It is certified that error appears in the above-identified patent and that said Letters Patent is hereby corrected as shown below:

Column 8, (Cont'd),
    receiving a broadcast message on a second common channel from a base station when the status of the broadcast indicator on the first common channel indicates that the base station is transmitting the broadcast message on the second common channel, wherein the broadcast message is received through the second common channel during a broadcast cycle and wherein the first common channel is quick paging channel and the second common channel is a paging channel or a broadcast channel.

Column 10,
Line 9, Claim 37 should read:
    37. A method comprising:
    receiving a broadcast indicator on a quick paging channel (QPCH);
    if the broadcast indicator indicates existence of a broadcast message, then monitoring a common control channel for reception of the broadcast message, wherein the common control channel is a paging channel or a broadcast channel;
    receiving an overhead message through the common control channel before receiving the broadcast indicator on the QPCH; and
    obtaining a first information and a second information in an overhead message, wherein the first information indicates a broadcast slot cycle index of transmitting the broadcast message and the second information indicates whether or not the at least one broadcast indicator is supported in the quick paging channel.

Signed and Sealed this

Twenty-ninth Day of November, 2005

JON W. DUDAS
*Director of the United States Patent and Trademark Office*